Patented May 26, 1953

2,640,077

UNITED STATES PATENT OFFICE 2,640,077

PREPARATION OF AMIDES

Marcus A. Naylor, Jr., Wilmington, Del., assignor to E. I. du Pont de Nemours and Company, Wilmington, Del., a corporation of Delaware No Drawing. Application March 9, 1951, Serial No. 214,840

14 Claims. (Cl. 260—561)

This invention relates to the preparation of aliphatic carboxylic acid amides from dialkyl sulfides, ammonium polysulfide and water. This application is a continuation-in-part of my copending application S. N. 185,907 (now abandoned) filed September 20, 1950, in which I have disclosed that the olefin-sulfur oils obtained as by-products in the formation of amides from olefins and aqueous ammonium polysulfide can be recycled with a further quantity of aqueous ammonium polysulfide at 200° to 350° C., whereby an additional quantity of amide is produced. These olefin-sulfur oils are composed of dialkyl sulfides.

An object of the present invention is to convert dialkyl sulfides to amides.

This object is accomplished by reacting such sulfides with aqueous ammonium polysulfide under the conditions hereinbelow set forth at a temperature between 180° C. and 340° C. In particular embodiments, the present invention comprises heating together a dialkyl sulfide containing from 6 to 13 carbon atoms per molecule with aqueous ammonium polysulfide at a temperature between 240° C. and 340° C.

Instead of introducing ammonium polysulfide as such, it is frequently practical and expedient to introduce a mixture which is produced by adding powdered sulfur to aqueous ammonia.

In a preferred method for practicing the invention the dialkyl disulfide which is employed is the alkene-sulfur oil which is produced as a by-product in the synthesis of amides from alkenes and aqueous ammonium polysulfide. Thus the invention can be practiced by heating a reaction mixture comprising an alkene and aqueous ammonium polysulfide at a temperature within the range of 140° C. to 300° C. whereby an alkanoic acid amide and an alkene-sulfur oil are obtained, separating alkanoic acid amide and alkene-sulfur oil from the resulting mixture, and thereafter heating the said alkene-sulfur oil at a temperature within the range of 180° C. to 340° C. in a reaction mixture comprising aqueous ammonium polysulfide whereby an additional quantity of alkanoic acid amide is obtained, and separating the said alkanoic acid amide from the resulting mixture. The invention also can be practiced by heating any dialkyl sulfide (e. g. a dialkyl monosulfide, dialkyl disulfide, dialkyl trisulfide, etc.) in a reaction mixture comprising aqueous ammonium polysulfide in this manner.

Any alkene may be employed in making the alkene-sulfur oil, but particularly advantageous results are obtained when the alkene is propylene or isobutylene; the amides produced from these specific olefins are propionamide and isobutyramide respectively. Other suitable alkenes include ethylene, n-butenes, pentenes, hexenes, 3,5,5-trimethylhexenes, diisobutylene, dodecenes, octadecenes and the like.

The alkene-sulfur oils may be prepared by employing, instead of ammonia, any primary or secondary amine, but it is usually preferred to employ ammonia. If N-alkyl amides are desired, primary or secondary alkyl amines may be used in place of ammonia in the conversion of the organic sulfides to amides. In recycling an alkene-sulfur oil with make-up alkene, it is preferred to employ initially at least 1.5 mols of free and combined ammonia per mol of alkene and at least 2 mols of water per mol of alkene. The optimum molar ratio of water: alkene is at least 2 and preferably no greater than 6. The quantity of alkene-sulfur oil to be recycled will of course depend upon the quantity produced as by-product, and this depends largely upon the reaction temperature as explained hereinafter in greater detail. The total quantity of free and combined sulfur is preferably from 2 to 6 mols per mol of olefin; the theoretical quantity (2 mols per mol of olefin) may be used, but it is generally better to introduce an excess of sulfur, so as to obtain optimum yields and reaction rates.

Hydrogen sulfide is preferably introduced into the reaction mixture in sufficient quantity to solubilize the sulfur in the aqueous ammoniacal solution. About 0.13 to 1.0 mol of hydrogen sulfide is preferably employed per mol of free sulfur introduced. This applies both to the process of producing alkene-sulfur oils, and the step of converting them to amides.

Any suitable reaction vessel may be employed in the practice of this invention. A tubular reactor composed of a coil of stainless steel tubing surrounded by a suitable liquid heat transfer medium gives excellent results. When such a reaction vessel is employed the reactants may be fed from individual containers and mixed in the feed lines before entering the reactor. Preferably, however, one of the reactants, e. g. the alkene, is injected separately so as to prevent the reaction from taking place until the preferred reaction conditions are obtained. In a preferred embodiment involving recycling an alkene-sulfur oil, a homogeneous solution is produced by mixing liquid ammonia and hydrogen sulfide with water, heating the mixture to a temperature above 120°, and adding sulfur thereto to produce the desired mol ratio of the necessary ingredients, as set forth above. This mixture can be preheated and injected into the tubular reactor while injecting preheated propylene (or other alkene) by means of a separate pump. The reaction product which emerges from the tubular reactor is discharged into a gas-liquid separator.

having an inside diameter of 0.25 inch, heated through a "Dowtherm" heat transfer medium), and the products were withdrawn and worked up as above described, except that the propylene-sulfur oil was continuously recycled to the reaction vessel. In a series of such runs the following results were obtained:

TABLE I
*Recycling propylene-sulfur oil in synthesis of propionamide from propylene*

| Reaction Temperature, °C. | Pressure (p. s. i.) | Mol Ratios in Feed Stream | | | | | | #/hr. Total Thruput | Yields | | Percent Oil in Liquid Product |
|---|---|---|---|---|---|---|---|---|---|---|---|
| | | $C_3H_6$ | $C_3H_8$ | $H_2O$ | $NH_3$ | S | $H_2S$ | | Amide, Percent on $C_3H_6$ | Acid, Percent on $C_3H_6$ | |
| 217–234 | 3,000 | 1 | 0.05 | 2.71 | 1.45 | 2.24 | 0.39 | 21.4 | 40 | 2–4 | 40–50 |
| 252–269 | 3,000 | 1 | 0.05 | 2.64 | 1.57 | 2.40 | 0.50 | 22.3 | 57 | 0.0 | 17 |
| 277–294 | 3,000 | 1 | 0.05 | 2.79 | 1.47 | 2.37 | 0.47 | 22.1 | 71 | 0.0 | 1–2 |
| 302–319 | 3,000 | 1 | 0.04 | 2.77 | 1.40 | 2.30 | 0.62 | 22.1 | 49 | 2.5 | |

The following materials are found in the liquid phase thus produced: propionamide, ammonium propionate, ammonium polysulfide, ammonium hydrosulfide, ammonium hydroxide, water and alkene-sulfur oils. The gaseous components of the reaction mixture are alkanes (when present as components of the alkene feed), ammonia, hydrogen sulfide, water, and a small amount of the more volatile alkene-sulfur oils. The separation of the gaseous and liquid phases can be carried out at atmospheric pressure and at a temperature of about 25° to 100° C., preferably about 50° C. Alternatively, the separation can be carried out at superatmospheric pressures and at temperatures in the range of about 100° C. to 200° C. Moreover, if desired, the pressure may be substantially the same as the pressure which is employed in the reaction vessel. If desired, the liquid stream from the gas-liquid separator can be run to a stripping column and an overhead stream consisting of water, ammonium hydrosulfide, alkene-sulfur oils, and small amounts of ammonium alkanoate can be recycled to the reaction vessel.

The recovery of alkanoic acid amide from the liquid phase products from the process of this invention is preferably accomplished by subjecting the said liquid phase to a preliminary distillation at diminished pressure. For example, when the pressure is lowered to about 300 mm., ammonium hydrosulfide together with some water start coming over at a head temperature of about 30° C. As the distillation progresses, alkene-sulfur oils appear in the distillate. The distillation can then be continued until substantially all of the steam-volatile alkene-sulfur oils have been removed from the propionamide. The distillation residue contains a mixture of alkanoic acid amide, some alkanoic acid, and alkene-sulfur oils together with a certain amount of sulfur. If desired, at this stage additional water can be added, and the distillation can be resumed. Finally, a propionamide cut is obtained at a temperature of about 110° C., and a pressure of 20 mm. A small amount of tarry residue remains in the distillation vessel.

The invention is illustrative further by means of the following examples.

*Example 1.*—Propylene, water, ammonia, sulfur and hydrogen sulfide were passed through a tubular reaction vessel (55 feet of coiled tubing,

*Example 2.*—The following reaction mixture was passed through a tubular reaction vessel at a temperature between 277° and 294° C. under a pressure of 3,000 lbs./sq. in.

| Feed | Pounds/hour |
|---|---|
| Propylene-sulfur oil | 6.47 |
| Water | 4.98 |
| Ammonia | 2.58 |
| Sulfur | 4.00 |
| Hydrogen sulfide | 2.18 |
| Total feed | 20.21 |

An analysis of the crude reaction products showed the formation of 3.63 pounds per hour of propionamide. Since the propylene-sulfur oil feed contained 2.4% by weight of propionamide, the actual production of propionamide resulting from the conversion of oils was 3.47 pounds per hour of amide.

*Example 3.*—The reaction of this example was carried out in a pressure tube lined with stainless steel. Agitation of the tube was accomplished by placing it in a rocker assembly equipped with band heaters.

A mixture of 59 parts of di-n-propyl monosulfide (0.5 mol), 70.5 parts of sulfur (2.2 mols), 23.8 parts of ammonia (1.4 mols), and 49.5 parts of water (2.75 mols) was introduced into the tube and the mixture was agitated for one hour at 250° to 264° C. The tube was cooled to room temperature, and the gaseous products essentially composed of hydrogen sulfide were bled off. A light brown liquid product (127 parts) was removed from the pressure tube, and the tube was washed with water which was added to the crude liquid product.

The liquid product was extracted with isopentane, and 6.2 parts of an oil was obtained upon evaporation. The aqueous layer containing 216 parts was distilled in an 18 inch Vigreux column; and upon removal of water, the pressure was reduced to 20 mm. Distillation was continued and 37.2 parts of a product identified as propionamide was collected at 118° C. The amount of amide represented 51 mol per cent, based upon the amount of di-n-propyl monosulfide fed into the reaction.

*Example 4.*—In a manner similar to Example 3 additional reactions were carried out, and the results are tabulated in Table II.

TABLE II

*Reaction of alkyl sulfides with sulfur and ammonia*

| Alkyl Sulfide | Quantity of Alkyl Sulfides (Mols) | Water (Mols) | Hydrogen Sulfide (Mols) | Sulfur (Mols) | Ammonia (Mols) | Reaction Temperature (° C.) | Reaction Time (Hrs.) | Yield of Propionamide, Percent by wt. of alkyl sulfide | Yield of Propionic Acid, Percent by wt. of alkyl sulfide |
|---|---|---|---|---|---|---|---|---|---|
| di-n-propyl disulfide | 0.5 | 2.75 | 0.6 | 2.2 | 1.4 | 252–265 | 1.0 | 54 | 15 |
| Do | 0.5 | 2.75 | 0.6 | 1.2 | 1.4 | 256–265 | 0.25 | 57 | 14 |
| Do | 0.5 | 2.75 | 0.08 | 1.7 | 1.4 | 258–260 | 0.25 | 71.5 | 12 |
| di-isopropyl disulfide | 0.124 | 0.68 | 0.15 | 0.54 | 0.35 | 258–266 | 1.0 | 61 | |

*Example 5.*—A sulfur-containing oil was prepared by reacting a mixture of the following materials in a pressure tube lined with stainless steel. Agitation of the tube was accomplished by placing it in a rocker assembly equipped with band heaters.

| | Parts |
|---|---|
| Aqueous ammonia (28% ammonia) | 150 |
| Sulfur | 64 |
| Isobutylene | 60 |
| Pyridine | 100 |

The above mixture was heated for 4 hours at a temperature between 150° C. and 160° C. The tube was cooled to room temperature, gaseous products (essentially H₂S) were bled off, and the liquid portion separated into two layers. The top layer was a light orange oil, and the bottom layer was the aqueous portion.

A composite of oils obtained from a number of runs identical to the one described above was distilled from a distilling flask at a temperature between 180° to 190° C. The distillate was then fractionated using a two-foot column packed with glass helices using a total reflux partial take-off head. Distillation was carried out at a pressure of 1 mm., and the following fractions were collected and separated:

| Fraction Number | Boiling Range, ° C. | Parts of Each Fraction | Refractive Index, 20° C. | Color |
|---|---|---|---|---|
| 1 | 27.5–30 | 20.2 | 1.4878 | Very light yellow. |
| 2 | 30 –46 | 35.8 | 1.5120 | Do. |
| 3 | 44 –52 | 17.3 | 1.5200 | Do. |
| 4 | 47 –52 | 14.6 | 1.5200 | Darker yellow. |
| Residue | | 26.3 | 1.5200 | Orange. |

The following physical constants were determined for the first fraction:

| Fraction No. 1 | Calculated for Isobutyl Disulfide |
|---|---|
| Molecular Refraction—53.6 | 53.2 |
| Percent Sulfur—34.5 | 35.9 |
| Percent Carbon—54.3 | 53.9 |
| Percent Hydrogen—10.3 | 10.18 |

The following physical constants were determined for the third fraction:

| Fraction No. 3 | Calculated for Isobutyl Trisulfide |
|---|---|
| Molecular Refraction—62.4 | 61.3 |
| Percent Sulfur—44.1 | 45.7 |
| Percent Carbon—46.2 | 45.6 |
| Percent Hydrogen—8.9 | 8.61 |

On the basis of the close comparison of the above physical constants for fractions 1 and 3 compared with the known physical data for isobutyl disulfide and isobutyl trisulfide respectively, fraction 1 was concluded to be isobutyl disulfide and fraction 3 was concluded to be isobutyl trisulfide.

On the basis of the above analysis fraction 2 was concluded to be a mixture of isobutyl disulfide and isobutyl trisulfide. A mixture of 30 parts of fraction 2, 64 parts of sulfur, 75 parts of aqueous ammonia (28% ammonia), and 50 parts of pyridine was introduced into a stainless steel hydrogenation bomb equipped with iron gaskets. Agitation of the bomb was accomplished by placing it in a rocker assembly equipped with band heaters. The mixture was agitated at about 220° C. for 4 hours. The bomb was cooled to room temperature, and hydrogen sulfide formed during the reaction was bled off. The liquid product was acidified with hydrochloric acid and filtered immediately. The filtrate was extracted continuously with ethyl ether for 20 hours to give 16 parts of a semi-solid upon evaporation of the ether. This extract was dissolved in more ether, treated with a decolorizing carbon, dried over sodium sulfate, filtered, cooled in a Dry Ice-methanol mixture, and filtered. A very light yellow solid (7 parts) was collected and identified as isobutyramide, M. P.=129° to 130° C. The yield of amide, based upon the weight of a mixture of isobutyl disulfide and isobutyl trisulfide, was about 28 mol percent.

It is to be understood that the foregoing examples are illustrative but are not intended to limit the invention. Thus, in Example 5, di-isobutylene can be employed in place of isobutylene, and the resulting disulfide can be converted to amide in the described manner.

If desired, molten sulfur may be introduced into the reaction vessel along with water, ammonia and hydrogen sulfide. Alternatively, a clear ammonium polysulfide solution may be prepared by adding the sulfur, water, ammonia and hydrogen sulfide in suitable proportions to form a homogeneous liquid (1 sulfide ion can solubilize 4 sulfur atoms), which homogeneous liquid can be injected into the reaction mixture along with propylene, or through a separate feed line. Still another method is to introduce ammonia, water and sulfur, without hydrogen sulfide; these ingredients can be introduced separately, if desired. Depending upon the end product desired, the reaction may be carried out in the presence of the inert solvent in the presence of water. If water is omitted, the carboxylic acid derivative is a thioamide. The use of a suitable solvent such as dioxane, pyridine, etc., is permissible but is usually not essential. Such inert solvents may be employed to render complex mixtures of reactants homogeneous and reduce the total vapor pressure of the heated reaction mass.

It is within the scope of the present invention to employ dialkyl sulfides in which different alkyl groups are in the molecule.

As the reaction temperature is increased, the rate of reaction increases, but the severity of degradation of the starting material increases and cleavage of carbon-to-carbon bonds occurs. Because elevated temperatures are required for amide formation, the reaction is carried on in a closed system to avoid loss of the reactants from the reaction medium by vaporization. Consequently, in the absence of applied pressure, the pressure of the system will vary with the temperature of the reaction and the volatility of the reactants or the reaction medium.

The proportion of dialkyl sulfide to the other reactants may be varied widely. To obtain good yields of carboxylic acid amides, a slight excess of ammonia is required over that which is chemically equivalent to the amount of alkyl sulfide. For example, 3 mols of ammonia per mol of dialkyl sulfide have given good yields of amides, and at least 2 moles of ammonia per mol of dialkyl mono- or di-sulfide is generally used. The amount of sulfur to be used should be as low as possible in most instances to decrease the probability of side reactants and increase the ease of processing the mixture of reaction products. It has been found that the reaction proceeds rapidly with good yields in the presence of an amount of sulfur in excess of that chemically equivalent to the amount of alkyl sulfide. It takes 2.5 atoms of sulfur, either as elemental sulfur or as sulfur in sulfide, to react with each alkyl radical. Accordingly, the amount of sulfur required to be added as ammonium polysulfide is not as high when the sulfide reactant is a disulfide as when it is a monosulfide.

The quantity of water initially present should be sufficient to convert any thioamide to carboxylic amide, and to facilitate handling the liquid reaction product. For example, 2 mols of water are necessary to react with one mol of dialkyl di- or mono-sulfide, and at least one additional mol of water is necessary to prevent formation of a thioamide and any other by-products and also contribute to making the reaction product sufficiently liquid to maintain the solid reactants and products in solution. The use of less than about 3 mols of water per mol of alkyl sulfide results in the formation of appreciable amounts of thioamide, other by-products, and excessive amounts of degradation products. Further, a water concentration below 3 mols per mol of alkyl sulfide makes handling of ammonium hydrosulfide formed difficult and thereby complicates the recovery process. On the other hand, a water concentration of about 6 to 10 mols per mol of alkyl sulfide contributes an excessive volume of liquid to be processed. The optimum amount of water recommended for the present process ranges from about 3 to 6 mols per mol of alkyl sulfide.

From the foregoing, it will be appreciated that the proportions of reactants present may be varied, as reaction will take place in the presence of any appreciable amounts of the reactants, merely the rate of the reaction and the approach of the yield to theoretical being affected as proportions are varied. Further, the considerations with respect to the proportions are equally applicable whether a mixture of sulfur and ammonia is used or yellow ammonium polysulfide. Small amounts of hydrogen sulfide, up to 1 mol per mol of alkyl sulfide, may be added initially to the mixture of ammonia and sulfur to dissolve the sulfur and promote rapid formation of a homogeneous reaction solution containing ammonium polysulfide.

The process of the invention is especially useful in the manufacture of propionamide and isobutyramide which are in turn highly valuable as intermediates in the manufacture of other useful chemicals.

I claim:

1. A process for preparing amides of aliphatic carboxylic acids which comprises heating a dialkyl sulfide of the formula alkyl(S)$_n$alkyl wherein $n$ is an integer of from 1 to 2 inclusive with aqueous ammonium polysulfide at a temperature within the range of 180° C. and 340° C. under superatmospheric pressure, whereby an aliphatic carboxylic acid amide is produced and thereafter separating the said amide from the resulting mixture.

2. A process for preparing amides of aliphatic carboxylic acids which comprises heating an alkyl sulfide of the formula alkyl(S)$_n$alkyl, wherein $n$ has a value of from 1 to 2 inclusive, with aqueous ammonium polysulfide at a temperature within the range of 240° to 340° C. under superatmospheric pressure, whereby an aliphatic carboxylic acid amide is produced and thereafter separating the said amide from the resulting mixture.

3. Process of claim 2 wherein the said alkyl sulfide is di-n-propyl monosulfide.

4. Process of claim 2 wherein the said alkyl sulfide is di-n-propyl disulfide.

5. Process of claim 2 wherein the said alkyl sulfide is di-isopropyl disulfide.

6. Process of claim 2 wherein the said alkyl sulfide is di-isobutyl disulfide.

7. A process for preparing amides of aliphatic carboxylic acids which comprises heating an alkyl sulfide of the formula alkyl(S)$_n$alkyl, wherein $n$ has a value of from 1 to 2 inclusive and the total number of carbon atoms per molecule is from 6 to 13 inclusive, with aqueous ammonium polysulfide at a temperature within the range of 240° C. to 340° C. under superatmospheric pressure, the quantity of water present being from 3 to 6 mols per mol of alkyl sulfide, the quantity of ammonia, free and combined, being from 2 to 3 mols per mol of alkyl sulfide, whereby an aliphatic acid amide is produced and thereafter separating the said amide from the resulting mixture.

8. A process for the synthesis of alkanoic acid amides which comprises heating a reaction mixture comprising an alkene and aqueous ammonium polysulfide at a temperature within the range of 140° C. to 300° C. whereby an alkanoic acid amide and an alkene-sulfur oil is obtained, separating alkanoic acid amide and alkene-sulfur oil from the resulting mixture, thereafter heating the said alkene-sulfur oil at a temperature within the range of 200° C. to 350° C. in a reaction mixture comprising aqueous ammonium polysulfide, whereby an additional quantity of alkanoic acid amide is obtained, and thereafter separating alkanoic acid amide from the resulting mixture.

9. A process for the synthesis of propionamide which comprises heating a reaction mixture comprising propylene and aqueous ammonium polysulfide at a temperature within the range of 140° C. to 300° C. whereby propionamide and a propylene-sulfur oil is obtained, separating propionamide and propylene-sulfur oil from the resulting mixture, and thereafter heating the said propylene-sulfur oil at a temperature within the range of 200° to 350° C. in a reaction mixture comprising aqueous ammonium polysulfide, whereby an additional quantity of propionamide is obtained, and thereafter separating propionamide from the resulting mixture.

10. The process of claim 9 wherein the formation of propionamide from the propylene-sulfur oil and ammonium polysulfide is carried out at a pressure of at least 2,000 lbs./sq. in.

11. The process of claim 9 wherein the formation of propionamide from the propylene-sulfur oil and ammonium polysulfide is carried out at a pressure of 3,000 to 5,000 lbs./sq. in.

12. The process of claim 9 in which the formation of propionamide from the propylene-sulfur oil is carried out at a pressure of at least 2,000 lbs./sq. in. and the reaction mixture comprises at least 1.5 mols of ammonia and at least 2 mols of water per mol of propylene.

13. The process of claim 9 in which the formation of propionamide from the propylene-sulfur oil is carried out at a pressure of at least 2,000 lbs./sq. in. and the reaction mixture comprises at least 1.5 mols of ammonia, including ammonia combined as ammonium polysulfide, at least 2 mols of water and from 2 to 6 mols of free and combined sulfur per mole of propylene.

14. The process of claim 13 in which the quantity of water is from 2 to 6 mols per mol of propylene.

MARCUS A. NAYLOR, Jr.

References Cited in the file of this patent

UNITED STATES PATENTS

| Number | Name | Date |
|---|---|---|
| 2,051,806 | Allen | Aug. 25, 1936 |
| 2,459,706 | King | Jan. 18, 1949 |
| 2,495,567 | Carmack | Jan. 24, 1950 |